United States Patent Office 2,976,208
Patented Mar. 21, 1961

2,976,208

DISPERSANT COMPOSITIONS AND TOXICANT CONCENTRATES CONTAINING THE SAME

Paul L. Lindner, Evanston, Ill., assignor, by mesne assignments, to Witco Chemical Company, Inc., New York, N.Y., a corporation of Delaware No Drawing. Original application Aug. 27, 1956, Ser. No. 606,182. Divided and this application Feb. 3, 1960, Ser. No. 6,349

15 Claims. (Cl. 167—42)

My invention relates to the production of new and useful dispersant compositions and to liquid biocidal toxicant compositions, particularly in the form of toxicant concentrates, containing said dispersants.

It has been found to be highly desirable, in certain situations, to be able to apply to an earth soil, in which plant or vegetable life is grown or contemplated to be grown, both water-soluble fertilizer material and also a desired pesticide, to wit, water-insoluble organic solvent-soluble insecticide or soil fumigant, hereafter generically called biocidal toxicant, in the form of a single composition. Efforts to provide such a composition, for instance, in the form of a stable, mobile, pourable or pumpable liquid emulsion, by simple mixing, present certain serious problems. The water-soluble fertilizer materials comprise water-soluble compounds, typical examples of which are potassium chloride, potassium nitrate, ammonium nitrate, ammonium sulphate, potassium sulphate, ammonium phosphate, and urea, with or without supplemental materials.

When dissolved in water to form strong solutions, particularly solutions approximating concentrated solutions, constituting the aqueous phase, and admixed with biocidal toxicant concentrates containing biocidal toxicants dissolved in organic solvents and insoluble in said aqueous phase, or solutions of such biocidal toxicants in organic solvents wherein said latter solutions, constituting the oleaginous phase, are insoluble in said aqueous phase, unstable dispersions form which readily and promptly separate out in the form of layers. Efforts to emulsify such aqueous phases and such oleaginous phases by means of usual types of emulsifying agents used in the toxicant emulsion field have proved entirely unsatisfactory. Non-ionic emulsifiers of the type of the polyoxyethylene derivatives of lipophillic materials, for instance, polyethylene glycol ethers of sorbitan monosterate, polyethylene glycol ethers of sorbitan monooleate, alkyl phenoxy polyoxyethanols, iso-octyl phenol polyoxyethylene ethers, and the like, have been found to be ineffective since they are salted out by the strong electrolytes in the high concentrations used in liquid fertilizer solutions. Similarly, higher alkyl aryl sulfonates, such as alkali metal, ammonium, magnesium or calcium salts of dodecyl benzene sulfonate, and the like, have likewise been found to be entirely unsatisfactory, whether used in conjunction with the non-ionic emulsifiers of the type mentioned above or by themselves.

The problem of providing satisfactory emulsions of aqueous liquid fertilizer solutions, particularly strong solutions, containing upwards of 20% of water-soluble fertilizer ingredients such as the monovalent and polyvalent ionic compounds described above and up to saturated aqueous solutions of said fertilizer solutions, with water-insoluble organic solvent-soluble biocidal toxicants has, so far as I am aware, not remotely been solved despite intensive efforts to do so. In certain instances, by means of special combinations of ingredients, it has been possible to prepare liquid fertilizer-biocidal toxicant compositions, but these must be prepared immediately prior to being used and must be used promptly since, among other things, their stability is of extremely short duration. Other special combinations of ingredients have been suggested, for instance, which are of use in liquid fertilizer-biocidal toxicant compositions but only if the liquid fertilizer contains trivalent phosphate ions and urea. In the presence of monovalent ions such as chlorides or nitrates, such latter compositions are of no commercial value because the emulsifying action of the combination of ingredients is destroyed.

I have discovered new and useful biocidal toxicant concentrates (and dispersant compositions for use therein) which, when admixed, by simple mixing, with liquid fertilizer compositions in the form of strong aqueous solutions, say in excess of 20% concentration up to saturation, produce homogeneous emulsions or dispersions which remain usable for periods of the order of at least several hours. My invention makes it unnecessary to pre-mix the biocidal toxicant concentrate with water just prior to admixing it with the liquid fertilizer solution, as is required with certain heretofore known biocidal toxicant concentrates. All that is necessary, in the case of biocidal toxicant concentrates made in accordance with my invention, is simple mixing or agitation with the liquid fertilzer solution. Moreover, my novel biocidal toxicant concentrates can effectively be used with liquid fertilizer compositions irrespective of whether the latter contain monovalent or polyvalent ions, and they are also usable with more dilute solutions of liquid fertilizers as, for instance, those containing of the order of 10 to 15% of solids. Thus, they have a universality of utility which is a most important practical consideration.

I have discovered that if there are utilized, in admixture, certain materials falling into two separate classes, and which are employed in certain ratios with respect to each other, all as is hereafter described in detail, a synergistic effect is obtained which brings about the entirely unpredictable and unexpected results which are achieved by my present invention.

The first of these ingredients, which, for convenience, may be called the (a) ingredient, comprises a compound which is a specific type of derivative of an alcohol amine and which may be characterized as a higher molecular weight fatty acid ester of an alcohol non-tertiary (that is, primary or secondary) amine, a reactive hydrogen of the amine radical of said alcohol non-tertiary amine being replaced by an acyl radical of a sulfopolycarboxylic acid, for instance, the sulfosuccinic acid radical

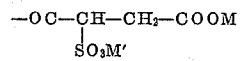

wherein M is an alkali metal or an organic substituted ammonium radical, and M' is an organic substituted ammonium radical. At least most of said compounds constituting said (a) ingredient may be represented by the formula

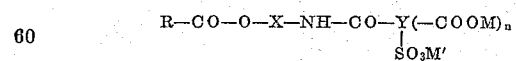

where R—CO— is a fatty acyl radical containing at least 8 and especially from 12 to 18 carbon atoms, X is the completely deaminated and dehydroxylated residue of an alcohol primary or secondary amine, especially monoethanolamine and monoisopropanolamine, Y is the completely decarboxylated residue of a polycarboxylic acid, especially an aliphatic dicarboxylic acid, M is an alkali metal or an organic substituted ammonium radical, M' is an organic substituted ammonium radical, and $n$ is 1 or 2.

The acyl radical (R—CO—) of said (a) ingredient is derived from oils or fats, hydrogenated or not, such as coconut oil, babassu oil, corn oil, castor oil, linseed oil, fish oils, cottonseed oil, soya bean oil, palm nut kernel oil, and the like, or fatty acids such as lauric acid, myristic acid, palmitic acid, stearic acid, oleic acid, linoleic acid and commercial mixtures of such fatty acids predominant in content of a desired one or ones of said fatty acid, or acylating derivatives of such acids as, for example, the acyl chlorides thereof.

The alcohol primary and secondary amines, particularly water-soluble hydroxy-alkyl primary amines, which are utilized to form the higher fatty acid ester linkage in the molecule in the preparation of the (a) ingredient can be selected from a large group, typical or illustrative examples of which are monoethanolamine, monopropanolamine, diethanolamine, isopropanolamine, monobutanolamine, isobutanolamine; 1-amino-2,3-propanediol; 2-amino-1,3-propanediol; diglycerolamine; 2-amino-2-methyl-1,3-propanediol; 2-amino-2-n-propyl-1,3-propanediol; and 2-amino-2-isopropyl-1,3-propanediol. Of especial utility are, as indicated above, monoethanolamine and monoisopropanolamine.

The polycarboxylic acids, the sulfo-derivatives of which are employed in the preparation of the (a) ingredient, can be chosen from a large group, typical or illustrative examples of which are maleic acid, fumaric acid, tartaric acid, glutaconic acid, itaconic acid, adipic acid, phthalic acid, sebacic acid, tricarballylic acid, and glutaric acid. Of particular utility are the aliphatic sulfopolycarboxylic acids, especially the water-soluble sulfodicarboxylic acids containing from 4 to 8 carbon atoms. The sulfosuccinic acid derivatives are particularly preferred.

The salt-forming radicals represented by M or M′ comprise, in the case of M, alkali metals (which term is here used to mean sodium, potassium, lithium and ammonium); and, in the case of M and M′, organic substituted ammonium radicals. The latter, which most advantageously are water-soluble lower molecular weight amines, may be selected from a wide group, typical examples of which are dimethylamine; diethylamine; triethylamine; propylamine; monoisopropylamine, diisopropylamine, triisopropylamine, and commercial mixtures of said isopropylamines; butyl amine; amyl amine; monoisopropanolamine, diisopropanolamine, triisopropanolamine and commercial mixtures of said isopropanolamines; ethanolamines such as monoethanolamine, diethanolamine, triethanolamine, and commercial mixtures thereof; polyamines such as aminoethyl ethanolamine, ethylenediamine, diethylenetriamine, hydroxyethyl ethylenediamine, and hexamethylenediamine; hexylamine; cyclohexylamine; dimethylbenzylamine, benzylamine; morpholine; methylcyclohexylamine; alkyl alkanolamines such as ethyl diethanolamine and diethyl ethanolamine; furfurylamine; piperidine; 2-amino-2-methyl-1-propanol; 2-amino-1-butanol; methyl piperidine, and the like, and compatible mixtures of any two or more thereof.

In the case of said first or (a) ingredient, it will be seen that, in the case of sulfodicarboxylic acid derivatives, the said salt may be the organic substituted ammonium di-salt, that is, where both M and M′ are organic substituted ammonium radicals, which may be the same or different organic substituted ammonium radicals; or the said salt may be a half alkali metal and half organic substituted ammonium salt which is the case where M is an alkali metal and M′ is an organic substituted ammonium radical. Of particular utility, as the first ingredient, are the organic substituted ammonium di-salts and the half ammonium half organic substituted ammonium salt of the sulfosuccinic acid amide of the oleic acid ester of isopropanolamine, wherein the organic substituted ammonium radical is an alkyl amine containing from 1 to 6 carbon atoms, especially isopropylamine. In the case of the sulfotricarboxylic acid derivatives, the said salt may be the organic substituted ammonium tri-salt, that is, where both M and M′ are organic substituted ammonium radicals, which may be the same or different organic substituted ammonium radicals; or the said salt may be a one-third alkali metal and two-thirds organic substituted ammonium salt, in which case M is an organic substituted ammonium radical and M′ is an alkali metal; or vice versa, that is, said salt may be a two-thirds alkali metal and one-third organic substituted ammonium salt, in which case M is an alkali metal and M′ is an organic substituted ammonium radical.

Illustrative examples of said (a) ingredient are the following (which include, also, the isomers thereof):

(1) 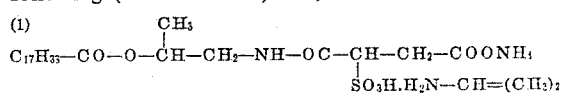

Half ammonium half isopropylamine salt of the sulfosuccinic acid amide of the oleic acid ester of isopropanolamine (2) 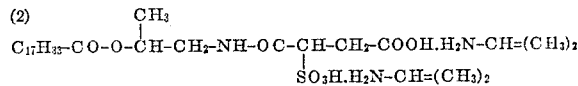

Isopropylamine di-salt of the sulfosuccinic acid amide of the oleic acid ester of isopropanolamine (3) 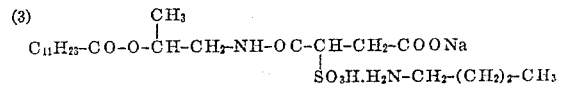

Half sodium half butyl amine salt of the sulfosuccinic acid amide of the lauric acid ester of isopropanolamine (4) 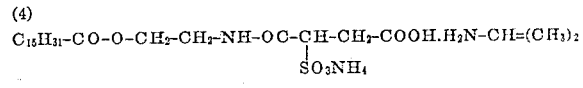

Half ammonium half isopropylamine salt of the sulfosuccinic acid amide of the palmitic acid ester of monoethanolamine (5) 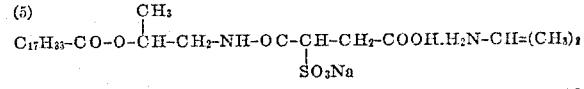

Half sodium half isopropylamine salt of the sulfosuccinic acid amide of the oleic acid ester of isopropanolamine (6) 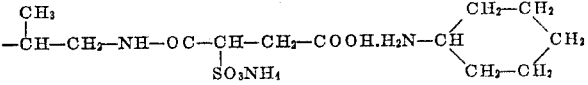

Half ammonium half cyclohexylamine salt of the sulfosuccinic acid amide of the myristic acid ester of isopropanolamine (7) 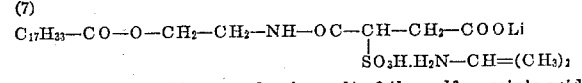

Half lithium half isopropylamine salt of the sulfosuccinic acid amide of the oleic acid ester of monoethanolamine (8) 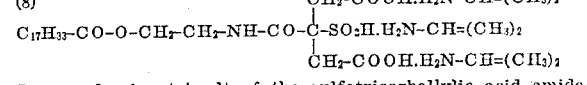

Isopropylamine tri-salt of the sulfotricarballylic acid amide of the oleic acid ester of monoethanolamine The (a) ingredient, for instance, the half alkali metal half organic substituted ammonium salts of the sulfosuccinic acid amides of the higher fatty acid esters of monoethanolamine or isopropanolamine, can readily be made by reacting the higher fatty acid ester of monoethanolamine or isopropanolamine with maleic anhydride and heating to about 100 degrees C. to produce the maleic amide. The free carboxyl group of the maleic acid radical of amide is then neutralized with an alkali metal or organic substituted ammonium base, and then the resulting compound is reacted with an alkali metal or amine bisulfite, as the case may be, in an aqueous or aqueous alcohol medium at 60 to 85 degrees C. The desired final product may be removed and purified for use in the practice of my present invention although purification steps usually will not be necessary. The water content of said product, as used in the practice of my invention, should not exceed about 25% and, more advantageously, should be about 15% or less. It will be most convenient to introduce the sulfonic group into the molecule by the use of an alkali metal bisulfite, in which case the prior neutralization of the free carboxyl group of the maleic acid radical of the maleic amide will first have been carried out with the organic substituted ammonium base if a half alkali metal half organic substituted ammonium salt is to be prepared. It is not material to the success of my invention which of the M or the M' cation is organic substituted ammonium radical but, as stated above, one of them should be an alkali metal and the other should be an organic substituted ammonium radical, or, in the broader aspect of my invention as I have shown, both M and M' can be an organic substituted ammonium cation. An alternative procedure involves neutralizing an alkali metal bisulfite with an organic substituted ammonium base and then utilizing the resulting amine neutralized alkali metal bisulfite in the reaction with the maleic acid amide of the higher fatty acid ester of the monoethanolamine or isopropanolamine. In the formulae given above and in the claims for the (a) ingredient, it will be understood that the M and M' may be interchanged, that is, the M cation may be attached to the SO₃ radical and the M' cation may be attached to the free carboxyl group of the maleic acid radical, and the claims should be so read. It will be understood that the method of making the aforementioned salts of the sulfosuccinic acid amides of the higher fatty acid esters of monoethanolamine and isopropanolamine, as the case may be, forms no part of the present invention and various methods for the production of said compounds will readily suggest themselves to those skilled in the art.

The second of said ingredients, which may, for convenience, be called the (b) ingredient, is an amine salt of an alkyl benzene sulfonic acid in which the alkyl radical contains from 12 to 18 carbon atoms. The alkyl radical, which is advantageously predominately a single higher alkyl radical, may be derived from polypropylenes, kerosene fractions, or the like, contains predominately from 12 to 18 carbon atoms, and, especially, predominately from 12 to 15 carbon atoms. The benzene nucleus may also contain lower alkyl substituents, provided that the number of carbon atoms in such lower alkyl constituents is in the range of from 1 to 3 and the number of such lower alkyl substituents does not exceed 2. The number of sulfonic acid radicals in the benzene nucleus may be 1 or 2, but, especially, there is only approximately one sulfonic acid radical in the benzene nucleus.

Certain of the higher alkyl benzene sulfonic acids which, in the form of their organic amine salts, are employed as the (b) ingredient in the practice of my invention can be represented by the formula

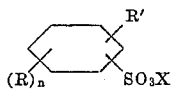

where R is a lower alkyl radical containing from 1 to 3 carbon atoms, such as methyl, ethyl, propyl and isopropyl, R' is a higher alkyl radical containing from 12 to 18 carbon atoms and especially from 12 to 15 carbon atoms, n is zero to 2, and X is an organic amine cation.

Typical examples of the organic amines whose salts of the higher alkyl benzene sulfonic acids are employed as the (b) ingredient in accordance with my present invention are those which have been mentioned above as being representative of M' in the general formula for the (a) ingredient. Particularly preferred are the alkyl amines containing from 1 to 6 carbon atoms and especially preferred is isopropyl amine. Typical or illustrative examples of the organic amine salts of the higher alkyl benzene sulfonic acids the use of which is encompassed by my invention are the following: diisopropanolamine salt of dodecyl benzene mono-sulfonic acid; isopropylamine salt of dodecyl benzene mono-sulfonic acid; diisopropylamine salt of dodecyl toluene mono-sulfonic acid; furfurylamine salt of pentadecyl benzene monosulfonic acid; cyclohexylamine salt of dodecyl monosulfonic acid; diisopropylamine salt of dodecyl isopropyl benzene sulfonic acid; morpholine salt of octadecyl benzene mono-sulfonic acid; and triisopropylamine salt of octadecyl benzene di-sulfonic acid; and mixtures of two or more thereof. The isopropylamine salt of dodecyl benzene mono-sulfonic acid is unusually satisfactory as the (b) ingredient and its use, in the combinations here involved, represents an important, though limited, embodiment of my invention.

It will be understood, of course, that mixtures of any two or more of the (a) and any two or more of the (b) ingredients can be employed in the practice of my present invention.

The biocidal toxicants which are used in accordance with my present invention and which, as stated above, comprise insecticides and soil fumigants, may be selected from a wide group typical examples of which are "Aldrin" (1,2,3,4,10,10 - hexachloro - 1,4,4a,5,8,8a - hexahydro-1,4,5,8-dimethanonaphthalene); "Dieldrin" (1,2,3,4,10,10 - hexachloro - 6,7 - epoxy,1,4,4a,5,6,7,8,8a - octahydroxy - 1,4 - endo - exo - 5,8 - dimethanonaphthalene); "Lindane" (gamma isomer of benzene hexachloride); "Heptachlor" (1,4,5,6,7,8,8 - heptachloro-3a,4,7,7a-tetrahydro - 4,7 - endo - methanoindene); "Nemagon" (1,2-dibromo-3-chloropropane); ethylene dibromide; DDT; organic thiocyanates such as B-butoxy, B'-thiocyanodiethyl ether, bornyl thiocyanoacetate; trichlorobenzene; propyl, butyl, and amyl ethers of pentachlorophenol, and the like, and compatible mixtures of any two or more thereof. Of especial importance are "Aldrin," "Dieldrin," "Lindane," "Heptachlor," and "Nemagon."

The organic solvent which is utilized in the preparation of the biocidal toxicant concentrates of my present invention, and in which the biocidal toxicant is soluble, may be selected from a known group of such organic solvents. Such organic solvents are of the type which are insoluble in the aqueous phase and, at least in most cases, will be per se insoluble in water. For convenience, said organic solvents are referred to herein as being "water-insoluble," and the same is true of the biocidal toxicants, although the criterion is essential insolubility in the aqueous phase of the emulsion. These include, for instance, aromatic hydrocarbon solvents, or blends thereof with paraffinic or naphthenic solvents. Examples of such solvents are kerosene; light refined mineral oil; methylnaphthalenes such as monomethyl naphthalene, dimethyl naphthalene and trimethyl naphthalene; ethyl naphthalene; 2-methylpentanediol-1,2; dipropylene glycol methyl ethers; benzene, toluene, aromatic naphthas, xylene, tetrahydronaphthalene, cyclohexane, and the like. These and various other organic solvents are frequently sold under trade names, such as "Cyclosol 53," which is an aromatic petroleum friction comprising methylated naphthalenes; and "Sovacide 544C" which is an aromatic petroleum oil containing methylated naphthalenes.

The (a) and (b) ingredients are incorporated into solutions of the biocidal toxicants in the selected organic solvent or mixtures of organic solvents to produce biocidal toxicant concentrates. Typical of such biocidal toxicant concentrates are so-called concentrates containing, for instance, 2 pounds "Heptachlor" per gallon; 1.5 pounds "Dieldrin" per gallon; 1 pound gamma equivalent benzene hexachloride per gallon; and 45% "Nemagon" concentrates. The content of the total of the (a) and (b) ingredients, by weight of the biocidal toxicant concentrate, will fall within the range of 3 to 30%, but, ordinarily, from 6 to 15%, and, particularly, from 8 to 12%, will be found quite satisfactory for most purposes. The relative proportions of the (a) and (b) ingredients, or, in other words, the weight ratio of the (a) to the (b) ingredient, should be at least 2 to 1, and is usually in the range of about 2 to about 20, preferably on an average of about 4 to 10, parts of the (a) ingredient to 1 part of the (b) ingredient. The upper limit of the (a) ingredient may, if desired, be at least several times the values recited above. Within the limits stated, the proportions of ingredients may be varied in order to obtain optimum results in connection with any particular liquid fertilizer solution.

The liquid fertilizer solutions (with which the hereinabove described biocidal toxicant concentrates are admixed to form homogeneous emulsions or dispersions which are usable over periods of at least several hours) are, per se, well known in the art. They comprise aqueous solutions, usually strong or concentrated aqueous solutions even up to saturation, of water-soluble compounds which fall into the category of providing at least one of the elements potassium, nitrogen and phosphorus, including, among others, as previously pointed out, potassium chloride, potassium nitrate, potassium sulphate, ammonium nitrate, ammonium sulphate, ammonium phosphate, aqueous ammonia, and the like, as well as organic water-soluble fertilizer materials particularly in conjunction with the inorganic water-soluble salts, such as those mentioned above, an especially preferred example of such organic water-soluble fertilizer material being urea. The liquid fertilizers, which will normally include one or more of the aforementioned materials, may be standardized as to their nitrogen, phosphorus (as $P_2O_5$) and potassium (as $K_2O$) contents. Typical examples of liquid fertilizer solutions, which can be used in conjunction with the novel biocidal toxicant concentrates of my invention are shown in a bulletin entitled "Preparation of Liquid Fertilizers," Second Edition, published by Victor Chemical Works, Chicago, Illinois.

The following examples are illustrative of biocidal toxicant concentrates, and dispersant compositions for use therein, falling within the scope of my invention. Other specific embodiments will readily occur to those skilled in the art in the light of the guiding teachings and principles disclosed herein. All parts listed are by weight.

*Example A*

| | Parts |
|---|---|
| "Aldrin" (90%) | 27.6 |
| Kerosene (deodorized) | 32 |
| "Cyclosol 53" (organic solvent) | 30.4 |
| Half ammonium half isopropylamine salt of the sulfosuccinic acid amide of the oleic acid ester of isopropanolamine | 8 |
| Isopropylamine salt of dodecyl benzene sulfonic acid | 2 |

*Example B*

| | Parts |
|---|---|
| "Dieldrin" (99%) | 18.2 |
| Heavy aromatic naphtha | 71.8 |
| Isopropylamine di-salt of the sulfosuccinic acid amide of the palmitic acid ester of monoethanolamine | 7 |
| Isopropylamine salt of dodecyl benzene sulfonic acid | 3 |

*Example C*

| | Parts |
|---|---|
| "Heptachlor" | 32.5 |
| "Sovacide 544C" | 57.5 |
| Isopropylamine tri-salt of the sulfotricarballylic acid amide of the oleic acid ester of isopropanolamine | 8 |
| Isopropylamine salt and dodecyl toluene sulfonic acid | 2 |

*Example D*

| | Parts |
|---|---|
| Half ammonium half isopropylamine salt of the sulfosuccinic acid amide of the oleic acid ester of isopropanolamine | 4 |
| Isopropylamine salt of dodecyl benzene sulfonic acid | 1 |

*Example E*

| | Parts |
|---|---|
| Isopropylamine di-salt of the sulfosuccinic acid amide of the palmitic acid ester of monoethanolamine | 5 |
| Isopropylamine salt of dodecyl benzene sulfonic acid | 1 |
| Kerosene | 1.5 |
| "Cyclosol 53" (organic solvent) | 15 |

In the use of the biocidal toxicant concentrates of my present invention, it will be understood, of course, that the amount of the liquid fertilizer solution will be many times the amount of the biocidal toxicant concentrate. In other words, the aqueous phase of the emulsion will, in all cases, be present in large excess over the oleaginous phase present in the biocidal toxicant concentrate. While such excess may vary somewhat, in the usual case it will be in the range of about 25 or 30 to 60 or even more times that of the oleaginous phase, but will usually be from about 30 to 40 times that of the oleaginous phase, all in terms of parts by weight.

In the use of the biocidal toxicant concentrates of my invention, the same are simply admixed with the aqueous or liquid fertilizer solution, with suitable agitation. For instance, 2.5 parts of the toxicant concentrate of Example A are admixed, with stirring, with 97.5 parts of a liquid fertilizer solution made up of 40 parts of 24.3% aqueous ammonia, 45.87 parts of 75% phosphoric acid, and 14.13 parts of water, all of said parts being by weight. In another typical example, 3 parts of the toxicant concentrate of Example B are admixed with 97 parts of said liquid fertilizer solution. Again, 3.3 parts of the toxicant concentrate of Example C are admixed with 96.7 parts of a liquid fertilizer solution made up of 44.3 parts ammonium nitrate, 35.4 parts urea, and 20.3 parts of water. Other illustrative commercial types of liquid fertilizer solutions with which my novel biocidal toxicant concentrates can be used are the so-called 8–25–0 (derived from ammonium phosphate); 8–8–8 (derived from ammonium phosphate, potassium chloride and urea); Uran 32 (derived from ammonium nitrate and urea), and 10–20–0 (derived from ammonium phosphate and urea).

This application is a division of my prior application Serial No. 606,182, filed August 27, 1956.

What I claim as new and desire to protect by Letters Patent of the United States is:

1. A dispersant composition, soluble in organic solvent solutions of water-insoluble biocidal toxicants, comprising (*a*) a compound in the form of a higher fatty acid ester of an alcohol non-tertiary amine, the higher fatty acid acyl radical of said ester containing from 8 to 18 carbon atoms, and a reactive hydrogen of the amine radical of said non-tertiary amine being replaced by an acyl radical of a sulfopolycarboxylic acid, said latter acyl radical containing from 4 to 8 carbon atoms and being represented by the formula $$-OC-\underset{\displaystyle SO_3M'}{\underset{|}{Y}}-(COOM)_n$$

wherein Y is the completely decarboxylated residue of said polycarboxylic acid, M is a member of the group consisting of alkali metals and organic substituted ammonium radicals, M' is an organic substituted ammonium radical, and *n* is an integer from 1 to 2, and (*b*) an amine salt of an alkyl benzene sulfonic acid in which the alkyl radical contains from 12 to 18 carbon atoms, the weight ratio of said (*a*) to said (*b*) ingredient being at least 2 to 1.

2. A dispersant composition, soluble in organic solvent solutions of water-insoluble biocidal toxicants, comprising (a) a compound corresponding to the formula
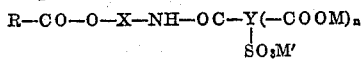
wherein R—CO— is a fatty acid acyl radical containing from 12 to 18 carbon atoms, X is the completely deaminated and dehydroxylated residue of water from 12 to 18 carbon atoms, X is the completely deaminated and dehydroxylated residue of a hydroxyalkyl primary amine selected from the group consisting of monoethanolamine and monoisopropanolamine, M is a member selected from the group consisting of alkali metals and organic substituted ammonium radicals, and M' is alkyl ammonium, and (b) an alkyl amine salt of an alkyl benzene sulfonic acid corresponding to the formula

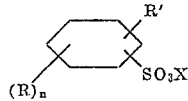

where R is a lower alkyl radical containing from 1 to 3 carbon atoms, R' is a higher alkyl radical containing from 12 to 18 carbon atoms, $n$ is zero to 2, and X is an organic amine cation, the weight ratio of said (a) to said (b) ingredient being at least 2 to 1, the total of said (a) and (b) ingredients constituting from 3 to 30%, by weight, of said concentrate, said concentrate being adapted, upon admixture with aqueous solutions containing upwards of 20% of fertilizer ingredients, to form a homogeneous dispersion usable for periods of the order of at least several hours.

12. A toxicant concentrate comprising an organic solvent solution of an organic water-insoluble biocidal toxicant and containing, dissolved therein, (a) a compound corresponding to the formula

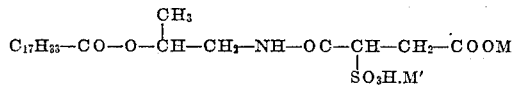

where M and M' are dissimilar and are selected from the group consisting of alkali metals and organic substituted ammonium radicals, and (b) an alkyl amine salt of dodecyl benzene sulfonic acid, the alkyl amine radicals containing from 1 to 6 carbon atoms, the weight ratio of said (a) to said (b) ingredient being from about 2 to about 20 of (a) to 1 of (b), the total of said (a) and (b) ingredients constituting from 6 to 15%, by weight, of said concentrate, said concentrate being adapted, upon admixture with aqueous solutions containing upwards of 20% of fertilizer ingredients, to form a homogeneous dispersion usable for periods of the order of at least several hours.

13. A toxicant concentrate comprising an organic solvent solution of an organic water-insoluble biocidal toxicant and containing, dissolved therein, (a) a compound corresponding to the formula

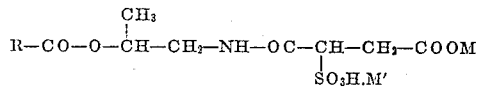

where R—CO is a fatty acid acyl radical containing from 12 to 18 carbon atoms, and M and M' are dissimilar and are selected from the group consisting of alkali metals and isopropyl ammonium, and (b) an alkylamine salt of dodecyl benzene sulfonic acid, the weight ratio of said (a) to said (b) ingredient being from about 2 to 20 of (a) to 1 of (b), the total of said (a) and (b) ingredients constituting from 6 to 15%, by weight, of said concentrate, said concentrate being adapted, upon admixture with aqueous solutions containing upwards of 20% of fertilizer ingredients, to form a homogeneous dispersion usable for periods of the order of at least several hours.

14. A combination biocidal toxicant water-soluble inorganic salt fertilizer composition containing an aqueous phase comprising a water solution of said water-soluble inorganic salt fertilizer material, and a normally water-immiscible oleaginous phase comprising an organic solvent solution of said biocidal toxicant, said composition comprising a substantially homogeneous emulsion which includes, in admixture therewith, (a) a compound in the form of a higher fatty acid ester of an alcohol non-tertiary amine, the higher fatty acid acyl radical of said ester containing from 8 to 18 carbon atoms, and a reactive hydrogen of the amine radical of said non-tertiary amine being replaced by an acyl radical of a sulfopolycarboxylic acid, said latter acyl radical containing from 4 to 8 carbon atoms and being represented by the formula

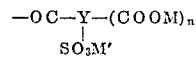

wherein Y is the completely decarboxylated residue of said polycarboxylic acid, M is a member of the group consisting of alkali metals and organic substituted ammonium radicals, M' is an organic substituted ammonium radical, and $n$ is an integer from 1 to 2, and (b) an amine salt of an alkyl benzene sulfonic acid in which the alkyl radical contains from 12 to 18 carbon atoms, the weight ratio of said (a) to said (b) ingredient being at least 2 to 1, the total of said (a) and (b) ingredients constituting from 3 to 30%, by weight, of the water-immiscible oleaginous phase.

15. A combination biocidal toxicant water-soluble inorganic salt fertilizer composition containing an aqueous phase comprising a water solution of at least 20% of said water-soluble inorganic salt fertilizer material, and a normally water-immiscible oleaginous phase comprising an organic solvent solution of said biocidal toxicant, said composition comprising a substantially homogeneous emulsion which includes, in admixture therewith, (a) a compound corresponding to the formula

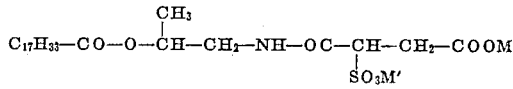

wherein M and M' are dissimilar and are selected from the group consisting of alkali metals and organic substituted ammonium radicals, and (b) the isopropyl amine salt of dodecyl benzene sulfonic acid, the weight ratio of said (a) to said (b) ingredient being from about 2 to about 20 of (a) to 1 of (b), the total of said (a) and (b) ingredients constituting from 6 to 15%, by weight, of the water-immiscible oleaginous phase.

References Cited in the file of this patent
UNITED STATES PATENTS

| | | |
|---|---|---|
| 2,236,528 | Epstein et al. | Apr. 1, 1941 |
| 2,236,529 | Epstein et al. | Apr. 1, 1941 |
| 2,686,201 | Keenan | Aug. 10, 1954 |
| 2,731,338 | Fike | Jan. 17, 1956 |
| 2,756,135 | Searle | July 24, 1956 |

OTHER REFERENCES

Brown et al.: Soap, "Formulations of Emulsions," July 1951, pp. 43, 45, 47 and 49.